(12) United States Patent
Iwasaki

(10) Patent No.: US 7,629,044 B2
(45) Date of Patent: *Dec. 8, 2009

(54) DISPLAY STRIP

(75) Inventor: Yoshio Iwasaki, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 595 days.

This patent is subject to a terminal disclaimer.

(21) Appl. No.: 10/537,447

(22) PCT Filed: Dec. 15, 2003

(86) PCT No.: PCT/JP03/16011

§ 371 (c)(1), (2), (4) Date: Mar. 21, 2006

(87) PCT Pub. No.: WO2004/054895

PCT Pub. Date: Jul. 1, 2004

(65) Prior Publication Data

US 2006/0163183 A1 Jul. 27, 2006

(30) Foreign Application Priority Data

Dec. 17, 2002 (JP) .............................. 2002-364953

(51) Int. Cl.
*B65D 73/00* (2006.01)
(52) U.S. Cl. .................... 428/343; 211/12; 211/113; 248/683
(58) Field of Classification Search ........................ None
See application file for complete search history.

(56) References Cited

U.S. PATENT DOCUMENTS

| 3,029,939 A | 4/1962 | Feldman ........................ 206/80 |
| 3,241,662 A * | 3/1966 | Robinson et al. ............ 428/343 |
| 3,864,895 A | 2/1975 | Petrea ........................ 156/556 |
| 3,897,295 A * | 7/1975 | Dowbenko et al. .......... 427/505 |

(Continued)

FOREIGN PATENT DOCUMENTS

DE 19941431 A1 3/2001

(Continued)

OTHER PUBLICATIONS

Schimtz, Peter, et al., "Films." Ullman's Encyclopedia of Industrial Chemistry, 5$^{th}$ Ed., vol. A11 (1988), pp. 85-95, 108-110.

(Continued)

*Primary Examiner*—Jennifer McNeil
*Assistant Examiner*—Adam C Krupicka
(74) *Attorney, Agent, or Firm*—Hogan & Hartson LLP

(57) ABSTRACT

It is an object of the present invention to provide a display strip with which the step of attaching a product-enclosed bag is easily automated and a product-enclosed bag is easily bonded again after the bag is once detached. The present invention relates to a display strip for arranging and attaching a plurality of product-enclosed bags for the display, which comprises at least a substrate layer and a sealant layer, the sealant layer being bondable to a surface layer of the bag by thermocompression bonding and having no pressure sensitive adhesive property before the thermocompression bonding, but being bondable to the bag again owing to exposure of a pressure sensitive adhesive face in the case of peeling of the bag bonded by thermocompression bonding.

6 Claims, 2 Drawing Sheets

U.S. PATENT DOCUMENTS

| | | | | |
|---|---|---|---|---|
| 4,013,188 A | 3/1977 | Ray | ............................ | 215/347 |
| 4,235,365 A | 11/1980 | Yoshii et al. | | |
| 4,337,862 A | 7/1982 | Suter | ............................ | 206/632 |
| 4,364,989 A | 12/1982 | Moyle | | |
| 4,370,369 A | 1/1983 | Bonis | | |
| 4,415,087 A | 11/1983 | Clayton et al. | | |
| 4,427,744 A * | 1/1984 | Hume, III | ..................... | 428/462 |
| 4,629,639 A | 12/1986 | Lucas | ......................... | 428/35.5 |
| 4,784,708 A | 11/1988 | Allen | | |
| 4,817,805 A | 4/1989 | Rodriguez | | |
| 4,886,690 A | 12/1989 | Davis et al. | | |
| 5,120,781 A | 6/1992 | Johnson, Jr. | ................. | 524/274 |
| 5,126,176 A | 6/1992 | Blaskovitz et al. | | |
| 5,145,737 A | 9/1992 | Boltron et al. | ..................... | 428/334 |
| 5,209,972 A * | 5/1993 | Super et al. | .................. | 428/349 |
| 5,366,777 A | 11/1994 | Bown et al. | .................... | 428/43 |
| 5,401,533 A | 3/1995 | Borland | | |
| 5,433,060 A * | 7/1995 | Gur et al. | ....................... | 53/413 |
| 5,589,246 A | 12/1996 | Calhoun | | |
| 5,625,006 A | 4/1997 | Callahan et al. | | |
| 5,919,863 A | 7/1999 | Seppanen et al. | .............. | 525/85 |
| 6,221,448 B1 | 4/2001 | Baetzold et al. | ............ | 428/35.2 |
| 6,405,778 B1 | 6/2002 | Belt | | |
| 6,481,184 B1 | 11/2002 | Junker et al. | ................... | 53/413 |
| 6,500,536 B1 | 12/2002 | Yamada et al. | | |
| 6,502,986 B1 | 1/2003 | Bensur et al. | ............... | 383/211 |
| 6,960,635 B2 | 11/2005 | Stevens et al. | ............... | 526/161 |
| 7,011,883 B2 | 3/2006 | Iwasaki et al. | | |
| 7,147,913 B2 | 12/2006 | Iwasaki et al. | | |
| 7,160,595 B2 | 1/2007 | Iwasaki et al. | | |
| 2003/0113519 A1 | 6/2003 | Waserman et al. | ........... | 428/195 |
| 2004/0040919 A1 | 3/2004 | Iwasaki et al. | ............. | 211/71.01 |
| 2004/0043175 A1 | 3/2004 | Iwasaki et al. | .............. | 428/40.1 |
| 2004/0197514 A1 | 10/2004 | Iwasaki et al. | ................. | 428/40.1 |
| 2004/0197577 A1 | 10/2004 | Iwasaki et al. | ................. | 428/457 |
| 2005/0123749 A1 | 6/2005 | Iwasaki | ....................... | 428/348 |
| 2006/0086682 A1 | 4/2006 | Iwasaki et al. | | |
| 2006/0163183 A1 | 7/2006 | Iwasaki | | |
| 2007/0092677 A1 | 4/2007 | Iwasaki et al. | | |
| 2008/0152850 A1* | 6/2008 | Paterson | .................... | 428/34.8 |

FOREIGN PATENT DOCUMENTS

| | | | | |
|---|---|---|---|---|
| EP | 000444865 | A2 | 9/1991 | |
| EP | 0708162 | A2 | 4/1996 | |
| EP | 0 742 772 | | 6/1999 | |
| EP | 942055 | | 9/1999 | |
| EP | 0 989 162 | | 3/2000 | |
| EP | 1085069 | A1 | 3/2001 | |
| EP | 1 167 220 | | 1/2002 | |
| JP | 44-1589 | | 1/1969 | |
| JP | 47-042226 | | 12/1972 | |
| JP | 62-251327 | | 11/1987 | |
| JP | 63-132051 | | 6/1988 | |
| JP | 01179235 | A | 7/1989 | .................... 7/125 |
| JP | 02-34467 | | 3/1990 | |
| JP | 03-200562 | | 2/1991 | |
| JP | 03-069461 | | 7/1991 | |
| JP | 04001151 | | 1/1992 | |
| JP | 04-115946 | | 4/1992 | |
| JP | 06-293356 | | 10/1994 | |
| JP | 07-289398 | | 11/1995 | |
| JP | 08-276966 | | 10/1996 | |
| JP | 10/080345 | | 3/1998 | |
| JP | 10-202801 | | 8/1998 | |
| JP | 10237405 | A | 8/1998 | .................... 123/8 |
| JP | 10/230971 | | 9/1998 | |
| JP | 11148054 | A | 2/1999 | ........................ 7/2 |
| JP | 11-165765 | A | 6/1999 | |
| JP | 2000-129234 | | 5/2000 | |
| JP | 2000-142650 | | 5/2000 | |
| JP | 2000-219789 | | 8/2000 | |
| JP | 2001-315836 | | 11/2001 | |
| JP | 2002-37279 | | 2/2002 | |
| JP | 2002/120175 | A2 | 12/2005 | |
| WO | 9308982 | A2 | 5/1993 | |
| WO | WO 98/52823 | | 11/1998 | |
| WO | 0167926 | A1 | 9/2001 | |

OTHER PUBLICATIONS

Ullmann's Encyclopedia of Industrial Chemistry, 5th Ed., vol. A11 (1988), pp. 105-106.

European Search Report for corresponding European application No. 03778919.5-2038 lists the references above.

* cited by examiner

DISPLAY STRIP

TECHNICAL FIELD

The present invention relates to a display strip for arranging and attaching a plurality of product-enclosed bags thereto for the display.

BACKGROUND ART

Some products such as snack foods are generally sold in pillow packages (vertical pillow, horizontal pillow) manner. In many cases, product-enclosed bags are arranged and sold on display racks in stores. However, in such cases, each and every bag had to be placed on the racks by hand, and the display place for sale was restricted to the given racks.

A known display method for product sale, called strip bag display requires no display rack. The strip bag display provides, as shown in FIG. 1, an arrangement in which a plurality of products are attached to a tape material with a prescribed width, called a display strip, and suspended. This display form needs no display rack and enables display and sale at any place, such as a place beside a register of a store, and a front desk area of a hotel.

Conventionally, as a display strip, those to which product-enclosed bags are attached by pressure sensitive adhesive force of the pressure sensitive adhesive tapes, such as those which comprise pressure sensitive adhesive tapes or those which are produced by previously punching holes in prescribed positions of tapes made of paper or resins and attaching pressure sensitive adhesive tapes from the rear face sides, have been employed. Such display strips are advantageous in that products can be attached again after once attached products are detached.

However, these display strips had a problem that it was difficult to automate a step of attaching product-enclosed bags to the display strips by an apparatus. That is, in the case it was tried to automate the attachment step for the display strips while the pressure sensitive adhesive tapes being exposed, the display strips were stuck to rollers and the like in passing through an apparatus to make it impossible to feed tapes as desired. On the other hand, in the case the pressure sensitive adhesive faces were covered with releasing sheets and the like, the work of attaching products consequently became complicated to make the automation difficult. Further, there was another problem that dust and stains were stuck to the surfaces of the adhesive tapes to worsen the appearance.

Against this problem, a display strip, of which a heat seal layer is formed on one side, is proposed so that product-enclosed bags may be directly attached by heat sealing. With such display strips, it is very easy to continuously automate a series of steps of attaching the product-enclosed bags to the display strips and enclosing a product in a bag. However, such heat seal type display strips required a sealer and the like for attaching products again after products were detached and it was difficult to work this for stores.

SUMMARY OF THE INVENTION

In view of the state of the art, it is an object of the present invention to provide a display strip with which a step of attaching product-enclosed bags thereto can easily be automated and once detached product-enclosed bags can be easily bonded again.

The present invention provides a display strip for arranging and attaching a plurality of product-enclosed bags for the display, which comprises at least a substrate layer and a sealant layer, the sealant layer being bondable to a surface layer of the bag by thermocompression bonding and having no pressure sensitive adhesive property before the thermocompression bonding, but being bondable to the bag again owing to exposure of a pressure sensitive adhesive face in the case of peeling of the bag bonded by thermocompression bonding.

It is preferable that the sealant layer contains a heat activated pressure sensitive adhesive and has a layered structure of two or more layers and it is more preferable that at least, the outermost layer is a heat activated pressure sensitive adhesive layer containing the heat activated pressure sensitive adhesive and an inner side layer of the heat activated pressure sensitive adhesive layer is a pressure sensitive adhesive layer having the pressure sensitive adhesive property at normal temperature. In addition, it is preferable that the heat activated pressure sensitive adhesive contains a thermoplastic resin with a second transition temperature of −10 to 70° C. and a solid plasticizer with a melting point of 70 to 120° C. and it is more preferable that the heat activated pressure sensitive adhesive further contains a tackifier.

It is preferable that the sealant layer has a layered structure of two or more layers and at least the outermost layer is a heat seal layer containing a thermofusible resin having no heat activated pressure sensitive adhesive property at normal temperature and an inner side layer of the heat seal layer is a pressure sensitive adhesive layer having the pressure sensitive adhesive property at normal temperature. The pressure sensitive adhesive layer having the pressure sensitive adhesive property at normal temperature is preferable to contain a rubber pressure sensitive adhesive or an acrylic pressure sensitive adhesive. In this case, the heat seal layer is preferable to have a thickness of the 20 μm or less.

The substrate layer is preferable to comprise biaxial oriented polypropylene, biaxial oriented polyethylene terephthalate, metal, paper, or these laminates.

The bag is preferable to comprise at least the sealant layer and the substrate layer. The sealant layer is preferable to comprise at least one selected from a group consisting of polypropylene, a copolymer of propylene and any other olefin, and low density polyethylene and the sealant layer is preferable to comprise a heat-sealable biaxial oriented polypropylene film. The sealant layer and the substrate layer are preferable to be laminated via an adhesive. The sealant layer and the substrate layer are preferable to be laminated via an intermediate layer and the sealant layer and the intermediate layer are more preferable to be laminated via an adhesive.

A display strip and product assembly, which is obtainable by bonding the display strip and a product-enclosed bag by heat sealing is also one of the present invention.

Figure 1:
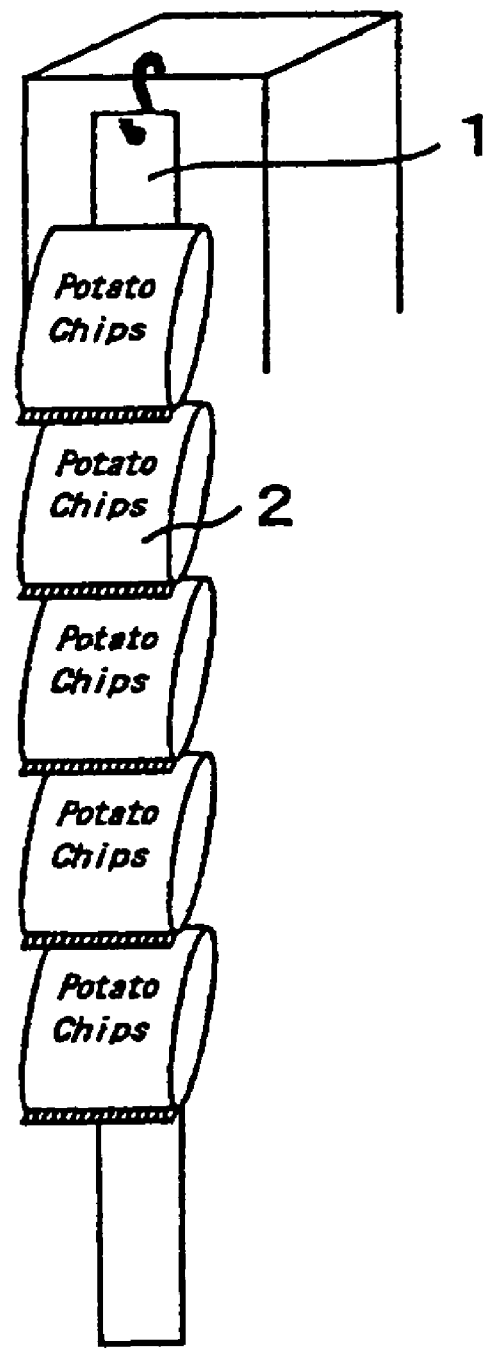
FIG. 1 is a schematic view showing a strip bag display.

In the drawings, reference numeral 1 represents a display strip; 2 represents a product-enclosed bag; and 3 represents a sealed site.

DETAILED DESCRIPTION OF THE INVENTION

Hereinafter, the present invention will be described in detail.

A display strip of the present invention comprises at least a substrate layer and the sealant layer can be bonded to the surface of a product-enclosing bag by thermocompression bonding.

With respect to the display strip of the present invention, the sealant layer has no pressure sensitive adhesive property before bonding by thermocompression bonding and thus it can easily be subjected to an automated apparatus but in the case the bag bonded by thermocompression bonding is detached, the pressure sensitive adhesive face is exposed to make it possible to bonding the bag again thereto.

Such a display strip is not particularly limited and examples of the display strip may include a display strip, for example, having a sealant layer containing a heat activated pressure sensitive adhesive (a first embodiment); a display strip having a sealant layer having a layered structure of two or more, the outermost layer being a heat seal layer containing a thermofusible resin having no pressure sensitive adhesive property at normal temperature and the inner side layer of the heat seal layer being a pressure sensitive adhesive layer having the pressure sensitive adhesive property at normal temperature (a second embodiment).

The display strip of the first embodiment of the present invention has a sealant layer containing a heat activated pressure sensitive adhesive. In this description, the heat activated pressure sensitive adhesive means an adhesive having the characteristic that the adhesive has no pressure sensitive adhesive property before being heated but has the pressure sensitive adhesive property by being heated and maintains the pressure sensitive adhesive property developed once even after the temperature is turned back to normal temperature. Such an adhesive is also called as a delayed tack pressure sensitive adhesive. As the delayed tack pressure sensitive adhesive, those described in U.S. Pat. No. 4,091,162 and the like may be employed.

The heat activated pressure sensitive adhesive is not particularly limited and those containing a thermoplastic resin with a second transition temperature of −10 to 70° C. and a solid plasticizer with a melting point of 70 to 120° C. are preferable to be used. Such a type of the heat activated pressure sensitive adhesive develops the pressure sensitive adhesive property by plasticizing the thermoplastic resin by solid plasticizer which is melted by heating.

The thermoplastic resin with a second transition temperature of −10 to 70° C. is not particularly limited and examples are acrylic polymers such as acrylic acid ester-methacrylic acid ester copolymers; vinyl acetate type polymers, synthetic rubber, and natural rubber. Examples of the acrylic polymers are copolymers of alkyl acrylic ester having an alkyl group of 2 to 10 carbon atoms and alkyl methacrylate ester having an alkyl group of 1 to 4 carbon atoms.

The solid plasticizer with a melting point of 70 to 120° C. is not particularly limited and examples of the solid plasticizer are dicyclohexyl phthalate, bis(cis-3,3,5-trimethylcyclohexyl) phthalate, and resorcinol bis[di(2,6-dimethylphenyl)phosphate].

The heat activated pressure sensitive adhesive containing the thermoplastic resin and the solid plasticizer is further preferable to further contain a tackifier. Addition of the tackifier may increase the pressure sensitive adhesive property developed by heating.

The tackifier is not particularly limited and examples are terpene resins, aliphatic petroleum resins and coumarone-indene resins.

As the heat activated pressure sensitive adhesive, other than the heat activated pressure sensitive adhesive containing the thermoplastic resin and the solid plasticizer, for example, heat activated pressure sensitive adhesives obtained by polymerizing monomer mixtures comprising butyl acrylate, 2-ethylhexyl acrylate, acrylonitrile, and N-methylolacrylamide in the presence of copolymers comprising methyl methacrylate, styrene, acrylic acid can be used.

Among the heat activated pressure sensitive adhesives, those which are commercially available are, for example, "Arontack" manufactured by Toagosei Chemical Industry Co., Ltd.; "Ecobrid" manufactured by Daicel Chem. Ind., Ltd.; and "Heatmagic" manufactured by Toyo Ink Mfg. Co., Ltd. and the commercially available heat activated pressure sensitive adhesives are selected from among these products.

With respect to the display strip of the first embodiment of the present invention, the sealant layer may be only a layer containing the heat activated pressure sensitive adhesive. In this case, when a bag is peeled from the display strip to which bags are attached, the pressure sensitive adhesive is not transferred to the bag side and the bag can be bonded again to the pressure sensitive adhesive remaining on the display strip.

In the case the display strip has a sealant layer with a layered structure of two or more layers, it is preferable that at least the outermost layer is a heat activated pressure sensitive adhesive layer containing the heat activated pressure sensitive adhesive and a layer in the inner side of the heat activated pressure sensitive adhesive layer is a pressure sensitive adhesive layer having the pressure sensitive adhesive property at normal temperature. Owing to such a structure, the pressure sensitive adhesive force of the pressure sensitive adhesive layer of the inner layer is added to the pressure sensitive adhesive property of the heat activated pressure sensitive adhesive developed by heating and therefore, even if the weight of a product enclosed in a bag is heavy, the bag may reliably be held.

The pressure sensitive adhesive composing the pressure sensitive adhesive layer having the pressure sensitive adhesive property at normal temperature is not particularly limited and examples are rubber type pressure sensitive adhesives containing natural rubber, synthetic rubber and the like; and solvent type, emulsion type or hot-melt type acrylic pressure sensitive adhesives containing acrylic acid esters and the like. As the rubber pressure sensitive adhesives, a polyisobutyrene type pressure sensitive adhesive, a butyl rubber type pressure sensitive adhesive, and a block copolymer type pressure sensitive adhesive can be exemplified.

The display strip of the first embodiment of the present invention is capable of bonding a product-enclosed bag thereto by pressure sensitive adhesive property of the heat activated pressure sensitive adhesive developed by thermocompression bonding with the bag since the sealant layer contains the heat activated pressure sensitive adhesive. Since the sealant layer has no pressure sensitive adhesive property before heating, the step of the thermocompression bonding of the bag can easily be automated. Further, since the pressure sensitive adhesive property once developed may be maintained even after the temperature is turned back to normal temperature, even if the attached bag is detached, the bag can be bonded again.

With respect to the display strip of the second embodiment of the present invention, the sealant layer has a layered structure of two or more layers and the outermost layer is a heat seal layer containing a thermofusible resin having no heat activated pressure sensitive adhesive property at normal temperature and the inner side layer of the heat seal layer is a pressure sensitive adhesive layer having the pressure sensitive adhesive property at normal temperature.

The thermofusible resin having no heat activated pressure sensitive adhesive property at normal temperature is not particularly limited and at least one resin selected from a group consisting of polypropylene, copolymers of propylene and any other olefins, low density polyethylene and ethylene-vinyl acetate copolymers is preferable. Addition of at least one resin selected from a group consisting of polypropylene, copolymers of propylene and any other olefins, low density polyethylene and ethylene-vinyl acetate copolymers to the heat seal layer provides an excellent heat seal property with heat-sealable biaxial oriented polypropylene (OPH), which is presently employed widely for sealant layers in the surfaces of many bags in Europe and US. Particularly, those containing polypropylene or copolymers of polypropylene and any other olefins as main components and mixed with low density polyethylene or ethylene-vinyl acetate copolymers for lowering the melting point are more preferable. In addition, the low density polyethylene also includes straight chain polyethylene obtained by polymerization using a single site catalyst or a Ziegler catalyst.

Since the heat seal layer has no pressure sensitive adhesive property at normal temperature, it also has a function as a mask layer for covering the pressure sensitive adhesive layer. By having such a mask layer, the display strip of the second embodiment of the present invention has no pressure sensitive adhesive property before heating and therefore, the step of the thermocompression bonding of the bag can easily be automated.

By having the pressure sensitive adhesive layer having the pressure sensitive adhesive property at normal temperature, the display strip of the second embodiment of the present invention is provided with the pressure sensitive adhesive force of the pressure sensitive adhesive layer in addition to the bonding force between the display strip and a bag by heat sealing, and therefore, even if the weight of the product enclosed in the bag is heavy, the bag may reliably be held. Further, in the case the once bonded bag is detached, the pressure sensitive adhesive layer in the inner side is exposed to make bonding of the bag again possible.

The thickness of the heat seal layer is preferable to be sufficiently thin relative to the thickness of the pressure sensitive adhesive layer of the inner side having the pressure sensitive adhesive property at normal temperature. The upper limit of the thickness of the heat seal layer is preferably 20 μm. If it is more than 20 μm, in the case the once bonded bag is detached, the pressure sensitive adhesive layer of the inner side is not exposed and it is sometimes made impossible to bond the bag again.

In the pressure sensitive adhesive layer having the pressure sensitive adhesive property at normal temperature, as the component for providing the pressure sensitive adhesive property, a rubber type pressure sensitive adhesive or acrylic pressure sensitive adhesive to be used as the pressure sensitive adhesive component of the heat activated pressure sensitive adhesive can be used.

Since the heat seal layer exists in the surface, it is no need to positively add a solid plasticizer to the pressure sensitive adhesive layer having the pressure sensitive adhesive property at normal temperature, however the solid plasticizer may be added to an extent that the aim of the present invention is not inhibited. In the case the solid plasticizer is contained in the pressure sensitive adhesive layer having the pressure sensitive adhesive property at normal temperature, it has no pressure sensitive adhesive property at normal temperature before the heat sealing is carried out, however it has the pressure sensitive adhesive property at normal temperature after the heat sealing. However, to obtain the pressure sensitive adhesive property as high as possible at normal temperature, it is preferable to contain no solid plasticizer.

Since the display strip of the second embodiment of the present invention comprises the sealant layer with the structure, a product-enclosed bag can be bonded to the display strip easily by heat sealing. Since the sealant layer has no pressure sensitive adhesive property before heating, it is no need to insert a release film and the step of the heat sealing of the bag can easily be automated. Further, in the case a bonded bag is detached, the heat seal layer is broken and the pressure sensitive adhesive layer of the inner side is exposed, so that the bag can be bonded again.

With respect to the display strip of the present invention, the sealant layer may be formed substantially on the entire face of the display strip or may be formed only on prescribed positions where products are to be attached. In the case it is formed substantially on the entire face of the display strip, products can be attached to any positions of the display strip and therefore, it is preferable. Additionally, the word, substantially, means that the position where a punching is carried out, the peripheral parts where no product can be attached and the like are excluded.

The substrate layer is not particularly limited, however it is preferable for the substrate layer to have sufficiently high strength since it is hung while many products being attached thereto and have heat resistance high enough to prevent melting or deterioration at the time of thermocompression bonding and for example, biaxial oriented polypropylene (OPP), biaxial oriented polyethylene terephthalate, metal foil, paper, or these laminates, and also paper coated with resin components and the like are preferable.

The thickness of the substrate layer is not particularly limited, however it is preferable to be 30 to 200 μm. If it is less than 30 μm, no sufficient strength can be obtained and it may possibly result in breakage at the time of display or detachment of a product-enclosed bag. If it is more than 200 μm, the substrate layer works as a heat insulator to inhibit sufficient heat conduction to the sealant layer at the time of thermocompression bonding.

The display strip of the present invention may have a layer which guarantees other functions between the substrate layer and the sealant layer. One example of such a layer is a printing layer. Particularly, in the case a polymer is used as the substrate layer, it is preferable to form the printing layer between the substrate layer and the sealant layer and in the case the substrate layer is made of paper, the printing is preferably carried out on the face other than the paper-layered face.

The shape of the display strip of the present invention is not particularly limited and a tape shape and a sheet shape can be exemplified. Further, at one end of the display strip of the present invention, a hole may be punched for hanging on a hook, or a clip and the like may be attached, for the display by hanging the display strip to which the products are attached. Particularly, since the punching step can easily be carried out during a series of automated step, it is preferable. But, when the display strip is hung on the hook through the punched hole, the portion around the hole tends to undergo stress and to be broken. Therefore, the substrate layer may be reinforced or those having a polyethylene layer or a nylon layer between the substrate layer and the sealant layer may be used.

As the bag for enclosing a product to be attached to the display strip of the present invention, any commonly used bag can be used and above all, those which comprise at least a sealant layer and a substrate are preferable. The sealant layer on the surface of the bag preferably comprises at least one selected from a group consisting of polypropylene, a copolymer of propylene and any other olefin, low density polyethylene, and an ethylene-vinyl acetate copolymer. The sealant layer on the surface of the bag preferably comprises a heat-sealable biaxial oriented polypropylene (OPH) film. The heat-sealable biaxial oriented polypropylene (OPH) film generally refers to a biaxial oriented polypropylene (OPP) film that is made heat-sealable with a very thin terpolymer layer formed thereon, which comprises a heat-sealable resin such as a propylene-ethylene-butene ternary copolymer. It is often adopted for a bag material particularly in the Europe and US.

The sealant layer and the substrate layer composing the bag enclosing a product are preferable to be laminated via an adhesive. Lamination via an adhesive gives high interlayer adhesive force and therefore the bag is not broken in the interlayer when the bag is detached from the display strip of the present invention and rather, breakage tends to occur in the interface between the display strip and the bag or in the inside of the display strip.

The sealant layer and the substrate layer composing the bag enclosing a product may be laminated via an intermediate layer. In this case, the sealant layer and the intermediate layer are preferable to be laminated via an adhesive. Since lamination of the sealant layer and the intermediate layer via an adhesive gives high interlayer adhesive force, the bag is not broken in the interlayer when the bag is detached from the display strip of the present invention and rather, breakage tends to occur in the interface between the display strip and the bag or in the inside of the display strip.

Such a bag enclosing a product may be produced by co-extruding a heat-sealable polymer and a polymer for forming the substrate layer or by coating a heat-sealable polymer such as a hot melt adhesive on the substrate layer.

As the bags for enclosing products to be attached to the display strip of the present invention, examples are those comprise biaxial oriented polypropylene (OPP) layer/print layer/adhesive layer/polyethylene (PE) layer/aluminum vapor-deposited polyethylene terephthalate (PET) layer/polyethylene (PE) layer/cast polypropylene (CPP) layer; biaxial oriented polypropylene (OPP) layer/print layer/polyethylene (PE) layer/aluminum vapor-deposited polyethylene terephthalate (PET) layer/polyethylene (PE) layer/cast polypropylene (CPP) layer; biaxial oriented polypropylene (OPP) layer/print layer/aluminum vapor-deposited cast polypropylene (CPP) layer; biaxial oriented polypropylene (OPP) layer/print layer/polyethylene (PE) layer/aluminum vapor-deposited cast polypropylene (CPP) layer; transparent, evaporated deposited, biaxial oriented polyethylene terephthalate (PET) layer/print layer/cast polypropylene (CPP) layer; heat-sealable biaxial oriented polypropylene (OPH) layer/print layer/polyethylene (PE) layer/aluminum vapor-deposited heat-sealable biaxial oriented polypropylene (OPH) layer; heat-sealable biaxial oriented polypropylene (OPH) layer/print layer/polyethylene (PE) layer/aluminum vapor-deposited cast polypropylene (CPP) layer; and heat-sealable biaxial oriented polypropylene (OPH) layer/print layer/adhesive layer/polyethylene (PE) layer/aluminum vapor-deposited cast polypropylene (CPP) layer.

A method for producing the display strip of the present invention is not particularly limited and a conventionally known coating method can be employed. For example, a method for forming the sealant layer by applying a heat activated pressure sensitive adhesive and the like in a prescribed thickness to the substrate layer by gravure coating or calendar coating can be exemplified. Depending on the thickness of the sealant layer, the same resin may be applied a plurality of times of coating.

In the case the sealant layer has two or more layers, after a pressure sensitive adhesive having the pressure sensitive adhesive property at normal temperature is applied to the substrate layer, the heat activated pressure sensitive adhesive and the like is applied further on it. Further, in the case the outermost layer is masked, after the pressure sensitive adhesive is applied to the substrate layer, a film of polypropylene, low density polyethylene, ethylene-vinyl acetate resin and the like to be used as a mask agent is laminated.

In the case the sealant layer is formed by coating the heat activated pressure sensitive adhesive layer and in the case the pressure sensitive adhesive having the pressure sensitive adhesive property at normal temperature is applied, they may be applied respectively in a range preferably 10 to 200 g/m$^2$ and more preferably 30 to 100 g/m$^2$.

Figure 2:
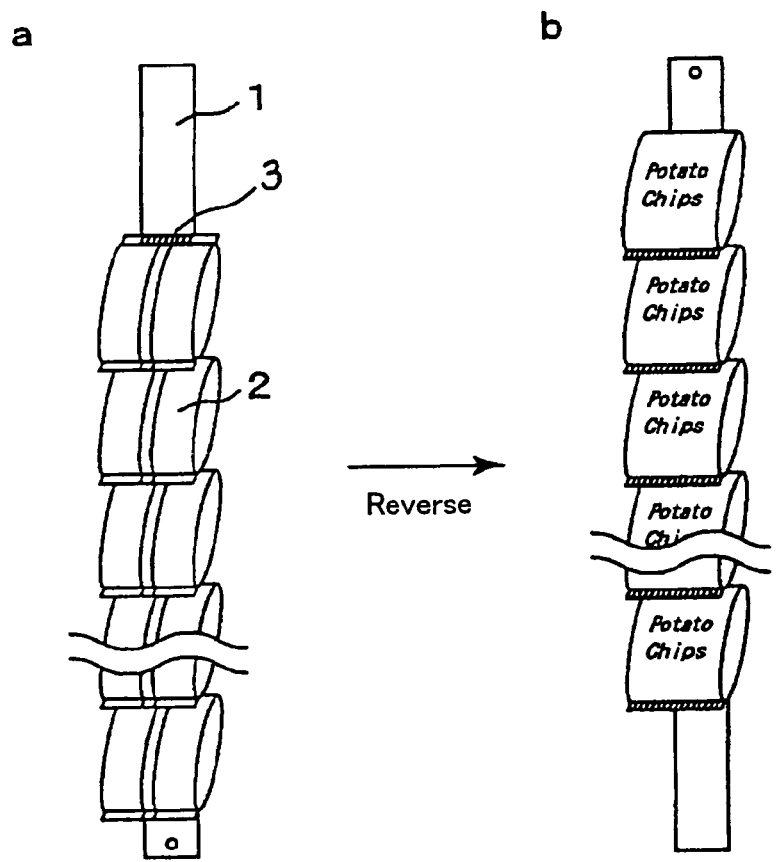
FIG. 2 is a schematic view showing an example of the step of attaching product-enclosed bags to the display strip of the present invention.
Figure 2:
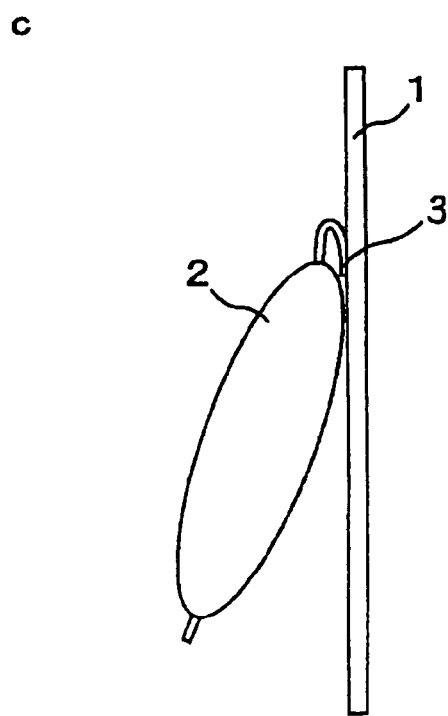

The method for attaching product-enclosing bags to the display strip of the present invention is not particularly limited and for example, it is preferable to attach the bags according to the step shown in FIG. 2. In this step, at first, product-enclosing bags are placed in a manner that the front side of the bag is in contact with the display strip and the upper parts of the bags are heat sealed to the display strip (FIG. 2a). When a prescribed number of product-enclosing bags are bonded to the display strip, the each product-enclosing bag turned upside down about the axis of the heat-sealed parts so as to set the front faces of the bags on the opposite to the display strip (FIG. 2b). In this state, when one end of the display strip is hung on a hook and the like for display, the attached portion between the bag and the display strip is in a state as shown in FIG. 2c, so that the each product-enclosing bag may easily be detached from the display strip with a small force by pulling the bags downward.

The bonding strength between the bag and the display strip is not particularly limited and it is preferably from 1 to 30 N/15 mm. If it is less than 1 N/15 mm, the products may fall under its own weight depending on the weights of the products and if it is more than 30 N/15 mm, even if the suspended bags with the products enclosed are pulled, the bags may not be detached. It is more preferably from 5 to 20 N/15 mm.

Use of the display strip of the present invention makes it possible to easily fix product-enclosing bags by thermocompression bonding and easily attach a large quantity of products thereto by automation. Also, even if a product-enclosing bag is detached from the display strip, the bag may be attached again to the display strip.

BEST MODES FOR CARRYING OUT THE INVENTION

The present invention will be more described in detail by Examples, however it is not intended that the present invention is limited to these Examples.

Example 1

A heat activated pressure sensitive adhesive (Heatmagic DW 1040W, manufactured by Toyo Ink Mfg. Co., Ltd.) was applied in a coating amount of 30 g/m$^2$ to a 50 µm-thick biaxial oriented polypropylene film by a bar coater and dried at 40° C. for 4 minutes by a drier. After the obtained laminate was aged at normal temperature for 1 day, it was cut in 35 mm width to obtain a display strip. No pressure sensitive adhesive property was observed in the surface of the obtained display strip.

Example 2

A heat activated pressure sensitive adhesive (Arontack TT-1225, manufactured by Toagosei Co., Ltd.) is applied in a coating amount of 40 g/m$^2$ to a polyethylene (PE) layer of laminate paper, which was obtained by laminating the PE in a 30 μm thickness on paper with a thickness of 50 g/m², by a bar coater and dried at 40° C. for 10 minutes by a drier. After the obtained laminate was aged at normal temperature for 1 day, it is cut in 35 mm width to obtain a display strip. No pressure sensitive adhesive property is observed in the surface of the obtained display strip.

Example 3

A heat activated pressure sensitive adhesive (Ecobrid TM-120, manufactured by Daicel Chem. Ind., Ltd.) was applied in a coating amount of 50 g/m² to a 75 μm-thick biaxial oriented polypropylene film by a bar coater and dried at 40° C. for 10 minutes by a drier. After the obtained laminate was aged at normal temperature for 1 day, it was cut in 35 mm width to obtain a display strip. No pressure sensitive adhesive property was observed in the surface of the obtained display strip.

Example 4

A heat activated pressure sensitive adhesive (Ecobrid TM-100, manufactured by Daicel Chem. Ind., Ltd.) is applied in a coating amount of 30 g/m² to the paper face of laminate paper, which is obtained by dry laminating paper with a thickness of 40 g/m² on a 12 μm-thick biaxial oriented polyethylene terephthalate film, by a bar coater and dried at 40° C. for 10 minutes by a drier. After the obtained laminate is aged at normal temperature for 1 day, it is cut in 35 mm width to obtain a display strip. No pressure sensitive adhesive property is observed in the surface of the obtained display strip.

Example 5

A butyl rubber type pressure sensitive adhesive having the pressure sensitive adhesive property at normal temperature is applied in a coating amount of 30 g/m² to a 50 μm-thick biaxial oriented polyethylene terephthalate film by a bar coater and dried at 40° C. for 4 minutes by a drier. After the obtained film is aged at normal temperature for 1 day, a 20 μm-thick layer of linear low density polyethylene polymerized with a single site catalyst is further laminated on the pressure sensitive adhesive layer. The obtained laminate is cut in 35 mm width to obtain a display strip. No pressure sensitive adhesive property is observed in the surface of the obtained display strip.

Example 6

After an anchor coat layer was applied on a 50 μm-thick biaxial oriented polyethylene terephthalate film, low density polyethylene with a thickness of 13 μm was laminated by extrusion lamination. A butyl rubber type pressure sensitive adhesive was applied in a coating amount of 30 g/m² to the low density polyethylene face by a bar coater and dried at 40° C. for 4 minutes by a drier. After the obtained film was aged at normal temperature for 1 day, an ethylene-vinyl acetate resin layer with a thickness of 5μ was laminated further on the pressure sensitive adhesive layer. The obtained laminate is cut in 35 mm width to obtain a display strip. No pressure sensitive adhesive property is observed in the surface of the obtained display strip.

Comparative Example 1

A 20 μm-thick layer of low density polyethylene polymerized with a metallocene was laminated on a 50 μm-thick biaxial oriented polypropylene film. The obtained laminate was cut in 35 mm width to obtain a display strip. No pressure sensitive adhesive property was observed in the surface of the obtained display strip.

Comparative Example 2

An acrylic pressure sensitive adhesive having the pressure sensitive adhesive property at normal temperature was applied in a thickness of 20 μm to a 50 μm-thick biaxial oriented polypropylene film and the obtained laminate was cut in 35 mm width to obtain a display strip.

(Evaluation)

The display strips produced in Examples and Comparative Examples were evaluated in the handling property, the adhesive property, and the re-adhesive property according to the following methods. The results were shown in Table 1.

(1) Evaluation of Handling Property

Each of the obtained display strips was supplied to a strip bag apparatus provided with an automatic tape feeding mechanism by rollers and whether the display strip could smoothly be sent or not was evaluated according to the following standards.

○: fed smoothly

X: clogged at roller part to make smooth feeding impossible (2) Evaluation of Adhesive Property Using a strip bag apparatus, a bag material was bonded by thermocompression bonding in conditions of seal temperature 195° C. and seal time 250 msec to produce bonded samples. With respect to each bonded sample cut in 15 mm width, the seal strength was measured at 300 mm/min pulling rate using a tensile strength tester (Strograph V1-C, Toyo Seiki Seisaku-Sho, Ltd.). As the bag material, a film of sealable OPP/ink/polyethylene/sealable OPP in the order from the surface in the total thickness of 50 μm was used.

(3) Evaluation of Re-Adhesive Property

Using a strip bag apparatus, a bag material was bonded by thermocompression bonding in conditions of seal temperature 195° C. and seal time 250 msec to produce bonded samples. After the bag material was peeled from bonded samples, packaging bags containing 50 g content were again bonded by thermocompression bonding and observed while being kept in hung state for 24 hours. The test was carried out using 10 specimens of each bonded sample and the number of the packaging bags dropping in 24 hours was counted.

TABLE 1

| | Handling property | Seal strength (N/15 mm) | Number of dropping bags in 24 hours |
|---|---|---|---|
| Example1 | ○ | 5.7 | 1 |
| Example3 | ○ | 8.5 | 0 |
| Comparative Example1 | ○ | 7.5 | Re-adhesion was impossible. |
| Comparative Example2 | x | — | — |

INDUSTRIAL APPLICABILITY

In accordance with the present invention, it is possible to provide a display strip with which the step of attaching a product-enclosed bag is easily automated and a product-enclosed bag is easily bonded again after the bag is once detached.

The invention claimed is:

1. A display strip for arranging and attaching a plurality of product-enclosed bags for a display, the display strip having a predetermined length and width, and having a hole close to one end thereof,
   which comprises at least a substrate layer and a sealant layer,
   wherein the sealant layer has a layered structure of two or more layers and at least the outermost layer is a heat seal layer containing a thermofusible resin having no pressure sensitive adhesive property at room temperature and an inner side layer of the sealant layer is a pressure sensitive adhesive layer having the pressure sensitive adhesive property at room temperature.

2. The display strip according to claim 1,
   wherein the pressure sensitive adhesive layer having the pressure sensitive adhesive property at room temperature contains a rubber pressure sensitive adhesive or an acrylic pressure sensitive adhesive.

3. The display strip according to claim 1 or 2,
   wherein the heat seal layer has a thickness of 20 μm or less.

4. The display strip according to claim 1 or 2,
   wherein the substrate layer comprises biaxial oriented polypropylene, biaxial oriented polyethylene terephthalate, metal, paper, or laminates.

5. The display strip according to claim 1,
   wherein the sealant layer comprises at least one resin selected from a group consisting of polypropylene, copolymers of propylene and other olefins, low density polyethylene and ethylene-vinyl acetate copolymers.

6. A display strip and product assembly,
   which is obtainable by bonding the display strip according to claim 1 and a product-enclosed bag by heat sealing.

* * * * *